(12) United States Patent
Kurtz

(10) Patent No.: US 8,651,134 B1
(45) Date of Patent: Feb. 18, 2014

(54) TOOL FOR OIL FILTER DRAINAGE

(76) Inventor: Brian Kurtz, Fairfield, CA (US)

( * ) Notice: Subject to any disclaimer, the term of this patent is extended or adjusted under 35 U.S.C. 154(b) by 175 days.

(21) Appl. No.: 13/224,735

(22) Filed: Sep. 2, 2011

Related U.S. Application Data

(60) Provisional application No. 61/382,727, filed on Sep. 14, 2010.

(51) Int. Cl.
*F16N 31/00* (2006.01)
*B25F 1/00* (2006.01)

(52) U.S. Cl.
USPC .............................. 137/318; 7/100; 141/330

(58) Field of Classification Search
USPC .................. 137/318; 7/100, 138; 141/330
See application file for complete search history.

(56) References Cited

U.S. PATENT DOCUMENTS

| 4,177,529 | A | * | 12/1979 | Sikula, Jr. | .......................... 7/100 |
| 5,657,676 | A | * | 8/1997 | Koller | ................................ 83/30 |
| 5,722,508 | A | * | 3/1998 | Kraus | ............................ 184/1.5 |
| 2008/0121582 | A1 | * | 5/2008 | Morris | ........................ 210/455 |

* cited by examiner

*Primary Examiner* — John K Fristoe, Jr.
*Assistant Examiner* — Kevin Barss
(74) *Attorney, Agent, or Firm* — Charles L. Thoeming

(57) ABSTRACT

A draining tool useful for controlled draining of a fluid container, such as a threaded spin-on type oil filter. The draining tool includes a piercing pin having a tapered point, striking head, resilient spring, resilient spring retainer assembly, and piercing pin retainer assembly. The draining tool includes a central block having an axial bore housing the piercing pin, and an internal chamber having a channel permitting drainage of fluid from the internal chamber. One end of the central block provides an attachment assembly suitable for holding the tool against the fluid container allowing the fluid container to be pierced by the piercing pin and the internal chamber to receive fluid flowing from the fluid container.

21 Claims, 3 Drawing Sheets

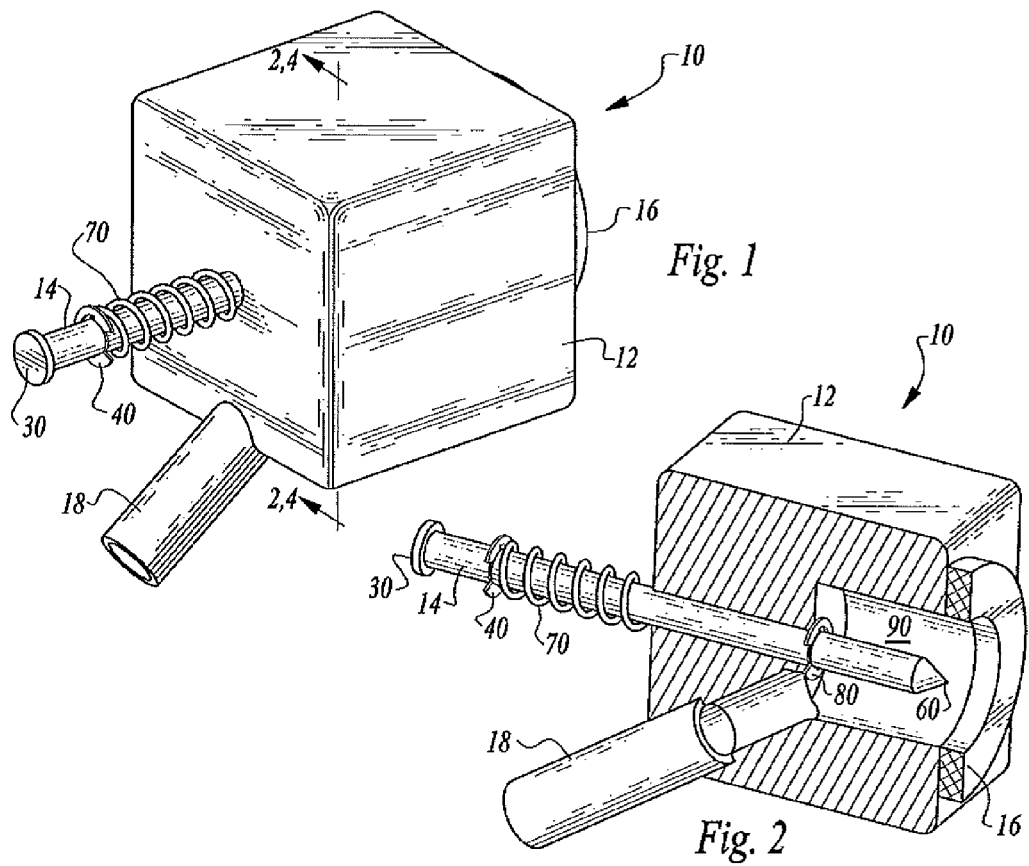
Fig. 1
Fig. 2
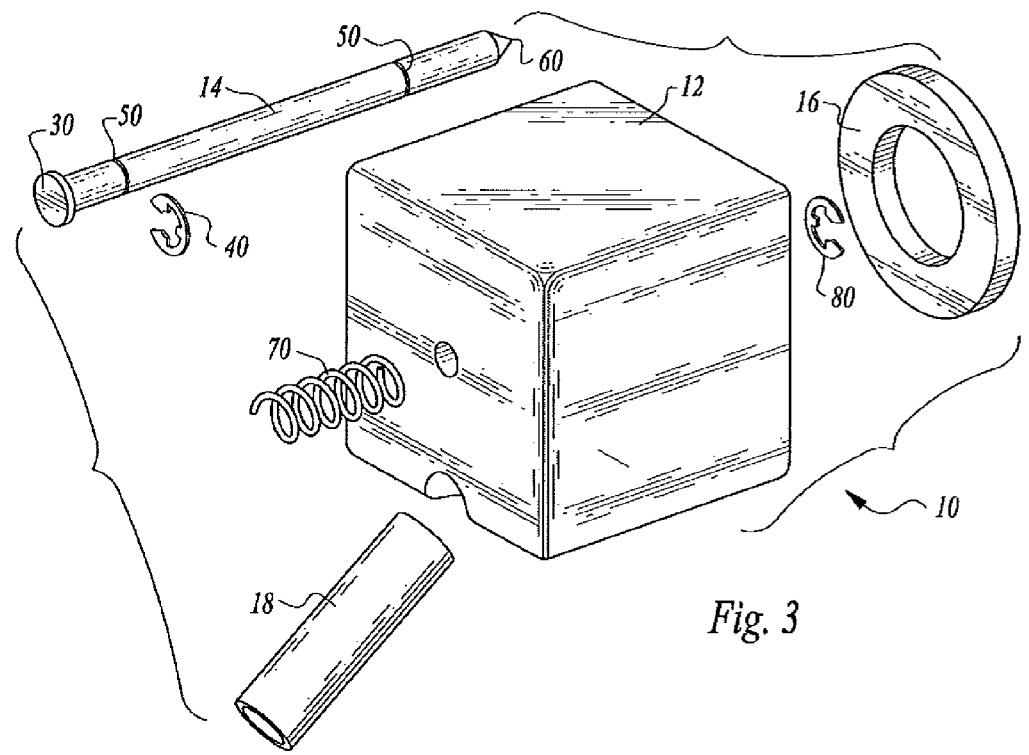
Fig. 3

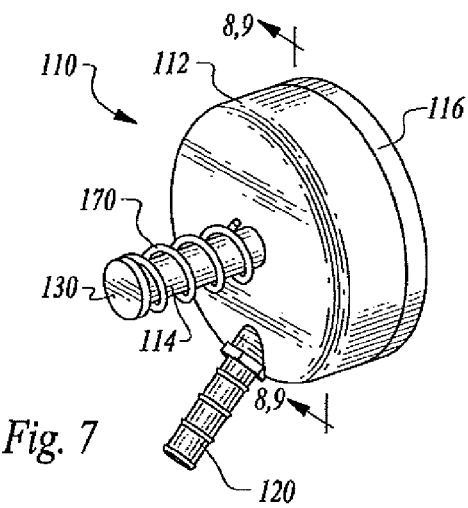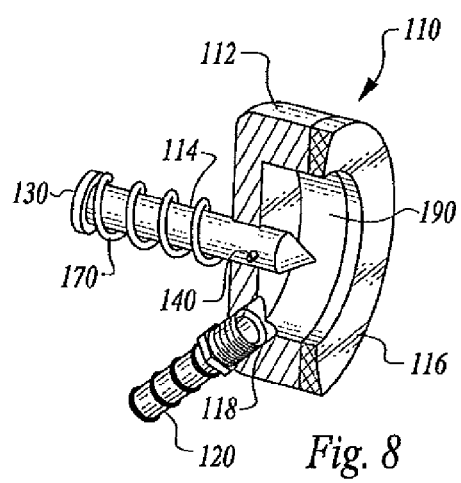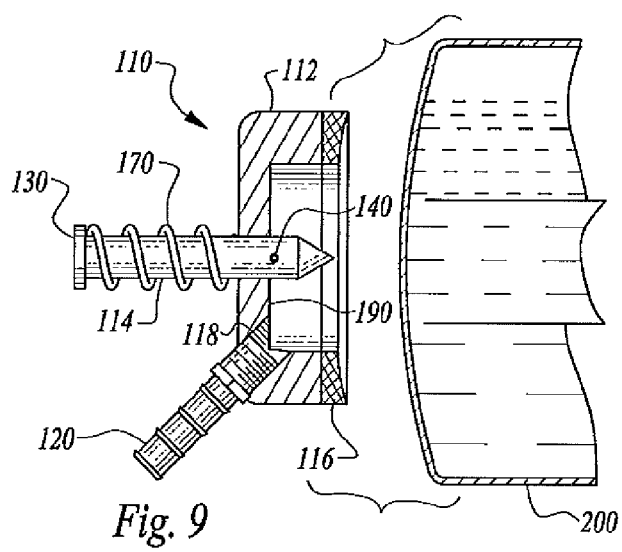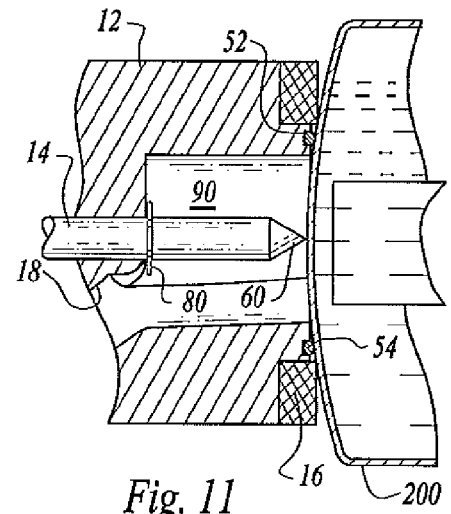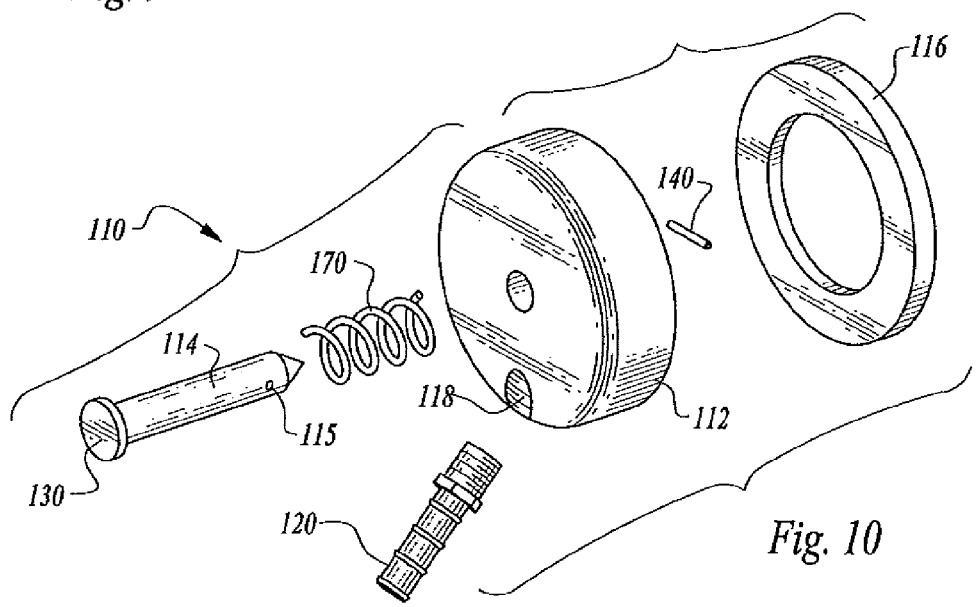

TOOL FOR OIL FILTER DRAINAGE

CROSS-REFERENCES TO RELATED APPLICATIONS

This United States non-provisional patent application is based upon and claims the filing date of U.S. provisional patent application Ser. No. 61/382,727 filed Sep. 14, 2010.

STATEMENT REGARDING FEDERALLY SPONSORED RESEARCH OR DEVELOPMENT

None.

REFERENCE TO A MICRO-FICHE APPENDIX

None.

TECHNICAL FIELD

The tool for oil filter drainage relates to the field of removing fluid from containers, and more particularly to a tool for insertion into the wall of a container with fluid, i.e. an oil filter, to permit the fluid to be controllably drained from the oil filter, before the oil filter is removed from the motor or machinery, to avoid leakage of the fluid from the oil filter.

BACKGROUND OF THE INVENTION

Lubrication systems in machinery, aircraft and vehicles require that their lubricants, viz., oil, and oil filters be replaced periodically in order to maintain the good working order of the engine and machinery. For passenger automobiles, many mechanics recommend a oil and filter change every 3,000 miles of travel to maintain maximum engine life. Professional truckers put thousands of miles on their trucks every week and wait many, many hours for oil changes over the course of a year.

Replacing the oil in a motor vehicle typically involves placing a large oil drain basin under the oil pan, removing the drain plug, thereby allowing the oil to drain therein, and unscrewing the oil filter from the engine block. Due to designs of most engines, it has been difficult to remove oil filters without spilling oil onto the frame of the vehicle, the vehicle engine, on the mechanics and/or the ground. This practice is not only messy, but is environmentally unsound. Since many oil changes are conducted when the oil is very hot, spillage from an oil filter upon removal also poses a safety hazard to mechanics.

Accordingly there is a need for a tool for oil filter drainage which is not only easy to use, simple in design, inexpensive to manufacture and which provides for leak proof operation, but which is designed to last a long term at a low cost.

It is thus an object of the tool for oil filter drainage to provide a novel control device for effectively containing oil from a filter upon removal of the filter from a vehicle engine and thus eliminating the environmental and safety issues associated with hot engine oil dripping onto the frame of the vehicle, onto the vehicle engine, onto mechanics and/or the ground.

It is a further object of the tool for oil filter drainage to provide a novel installation in which oil from an oil filter to be removed from a vehicle engine can be removed from the filter and safely diverted to a waste oil container.

It is still a further object of the tool for oil filter drainage to provide actuation of a piercing pin to quickly and effectively open the oil filter to allow waste oil flow into a containment vessel and exit the containment vessel through a channel which can be connected to a waste oil container.

It is yet still a further object of the tool for oil filter drainage to provide a novel tool for oil filter drainage which can be reused and/or connected quickly without extensive use of tools or knowledge of complex mechanical considerations.

Yet a further object of the tool for oil filter drainage is to provide a stoppage proof waste oil drain channel that eliminates an obstruction potential for typical spin-on type oil filters while the oil filter is still attached to a vehicle engine.

SUMMARY OF THE INVENTION

The tool for oil filter drainage provides a fluid container draining device which allows fluid to be removed from a fluid container in a controlled manner, the fluid container having walls defining a fluid filled interior region there between, the fluid container draining device having a round, magnetic end ring element attached to a central block body element. The central block body element contains an internal collection chamber, and a central axis with an axial bore along the central axis through the central block body element. The axial bore houses the piercing pin and a coil spring, including a striking surface, spring retainer, retaining clip groove, tapered point, and retaining clip. The central block body element internal chamber further provides a drainage channel from the internal chamber to outside the central block body element. The piercing pin is sized to extend beyond central block body element and into the central block body element internal chamber so as to sufficiently extend beyond the round, magnetic end ring element and through the metal wall of a spin-on oil filter attached to the round, magnetic end ring element when the piercing pin is struck on the striking surface. The piercing pin is fitted with a seal between it and the central block body element internal chamber. Further, the piercing pin is fitted with a retaining clip groove and retaining clip within the central block body element internal chamber to prevent the piercing pin from sliding out of the central block body element.

The tapered point of the piercing pin is suitable for piercing the exterior of an oil filter. The exterior portion of the piercing pin relative to central block body element includes a striking surface and retainer. The piercing pin is aligned in the axial bore of the central block body element so that the coil spring is between the retainer and the central block body element. In this manner, when force is applied to the striking surface, such as a blow from a hammer, the piercing pin is returned to its original position by compression of the coil spring between the retainer and the central block body element.

The drainage channel from the internal chamber to outside the central block body element is sized to be connected to standard hose or tubing to direct the flow of the waste oil from the oil filter through the internal chamber to an oil drain pan or other collection reservoir for waste engine oil.

Thus, the tool for oil filter drainage provides a central block body element with a round, magnetic end ring element suitable for attachment to a metal oil filter on a vehicle engine. Once the central block body element is so attached to the oil filter, the piercing pin striking surface is struck with force sufficient to overcome the tension of the coil spring, and the piercing pin tapered point travels along the axial bore of the central block body element, through the through the internal chamber, past the round, magnetic end ring element, piercing into and through the oil filter wall. As the coil spring returns the piercing pin to the original position before the striking force was applied to the piercing pin striking surface, waste oil flows from the punctured oil filter into the internal chamber, out the drainage channel, through a hose or tube connected to the drainage channel, and into a waste oil drain pan or containment reservoir.

An alternate embodiment of the tool for oil filter drainage provides a fluid container draining device having a cylindrical central body element and corresponding cylindrical internal chamber.

BRIEF DESCRIPTION OF DRAWINGS

The above stated features, aspects, and advantages of the tool for oil filter drainage will become better understood with regard to the following description and accompanying drawings as further described.

FIG. 1 is a perspective elevation view of an embodiment of a tool for oil filter drainage 10 including a central block body element 12 having a central axis with an axial bore along the central axis through the central block body element 12, the axial bore housing a piercing pin 14 and a spring 70 assembly having a striking surface 30 and a spring retainer 40 and a drainage channel 18, and a round, magnetic end ring element 16.

FIG. 2 is a perspective sectional view of the embodiment of the tool for oil filter drainage 10 of FIG. 1 taken at "2-2" including a central block body element 12 having a central axis with an axial bore along the central axis through the central block body element 12, depicting the axial bore housing the piercing pin 14, tapered point 60, and retaining clip 80 within a central block body element 12 internal chamber 90 having a drainage channel 18, and central block body element 12 round, magnetic end ring element 16.

FIG. 3 is an exploded perspective view of the embodiment of the tool for oil filter drainage 10 of FIG. 1 including a central block body element 12 having a central axis with an axial bore along the central axis through the central block body element 12, depicting piercing pin 14 and striking surface 30, spring retainer 40, retaining clip grooves 50, spring 70, retaining clip 80, magnetic end ring element 16, and drainage channel 18.

FIG. 7 is a perspective view of an alternate embodiment of a tool for oil filter drainage 110 including a cylindrical central body element 112 having an magnetic end ring element 116, a central axis with an axial bore along the central axis through the central block body element 112, the axial bore housing a piercing pin 114 and a spring 170 assembly having a striking surface 130 and a retainer pin 140, and threaded drain 120.

FIG. 8 is a detailed perspective sectional view of the alternate embodiment of a tool for oil filter drainage 110 taken at "8-8" including a cylindrical central body element 112 having an magnetic end ring element 116 and an internal chamber 190, a central axis with an axial bore along the central axis through the central block body element 112, the axial bore housing a piercing pin 114 and a spring 170 assembly having a striking surface 130 and a retainer pin 140 and a threaded drainage channel 118 and threaded drain 120.

FIG. 9 is a detailed perspective sectional view of the alternate embodiment of a tool for oil filter drainage 110 taken at "9-9" including a cylindrical central body element 112 having an magnetic end ring element 116 and an internal chamber 190, a central axis with an axial bore along the central axis through the central block body element 112, the axial bore housing a piercing pin 114 and a spring 170 assembly having a striking surface 130 and a retainer pin 140 and a threaded drainage channel 118 and threaded drain 120, wherein the cylindrical central body element 112 is position to be affixed to the end of oil filter 200 affixed to an engine block (not shown).

FIG. 10 is an exploded perspective rear view of an alternate embodiment of a tool for oil filter drainage 110 of FIG. 7 including a cylindrical central body element 112 having an magnetic end ring element 116 and an internal chamber 190, a central axis with an axial bore along the central axis through the central block body element 112, the axial bore housing a piercing pin 114 and a resilient spring 170 assembly having a striking surface 130, a retainer pin 140, a pin aperture 115, a threaded drainage channel 118 and threaded drain 120.

FIG. 11 is a detailed sectional view of an embodiment of tool for oil filter drainage 10 of FIG. 1 taken at "4-4" depicting a magnetic end ring element 16 integral to the central block body element 12 and a groove 52 housing an O-ring 54.

BEST MODE FOR CARRYING OUT THE INVENTION

Figure 4:
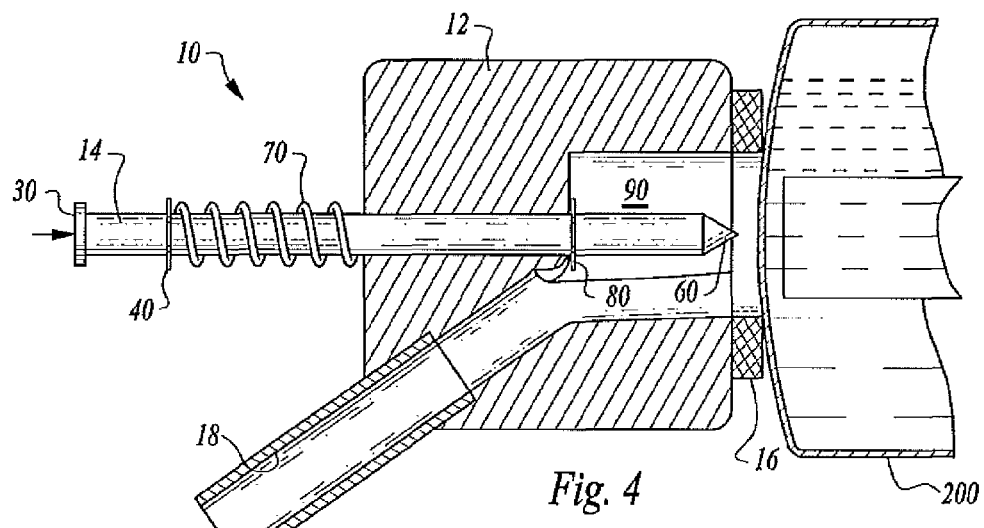
FIG. 4 is a detailed sectional view of the piercing pin 14 and a spring 70 assembly for an embodiment of tool for oil filter drainage 10 of FIG. 1 taken at "4-4" positioned against the end of an oil filter 200 affixed to an engine block (not shown), including a striking surface 30, spring retainer 40, tapered point 60, and retaining clip 80, internal chamber 90 having a drainage channel 18, and magnetic end ring element 16 connecting the central block body element 12 to the oil filter 200, and depicting the action of the piercing pin 14 traveling through the central block body element 12 upon force striking the striking surface 30.
Figure 5:
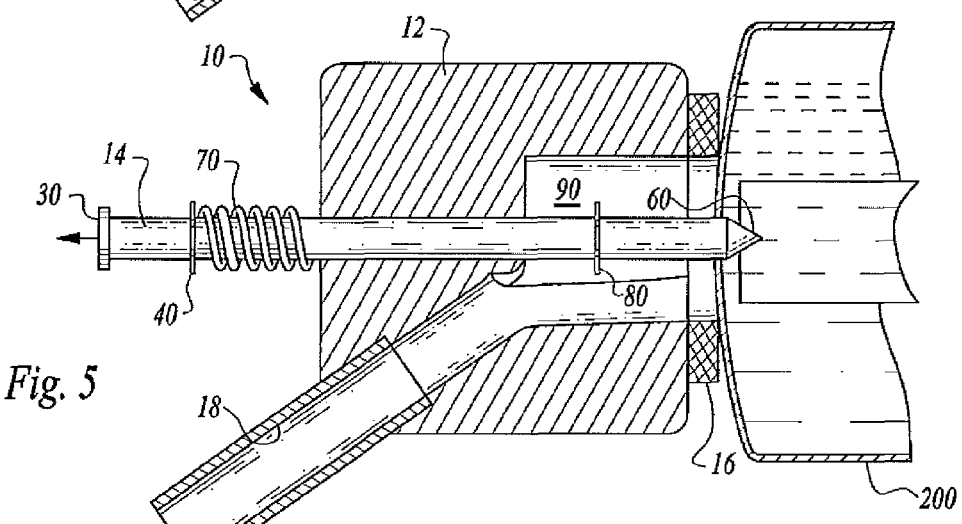
FIG. 5 is a detailed sectional view of an embodiment of tool for oil filter drainage 10 of FIG. 1 taken at "4-4" depicting a central block body element 12 having a central axis with an axial bore along the central axis through the central block body element 12, depicting the axial bore housing the piercing pin 14 and selected elements of the piercing pin 14 namely, (i) a tapered point 60, (ii) a retaining clip 80, (iii) a spring 70, (iv) a spring retainer 40, and (v) a striking surface 30, and a central block body element 12 internal chamber 90 having a drainage channel 18, and central block body element 12 and magnetic end ring element 16 depicting the action of the piercing pin 14 after it has pierced the end of oil filter 200 traveling back through the central block body element 12 upon force of the spring 70 compressed between the spring retainer 40 and the outside surface of the central block body element 12.
Figure 6:
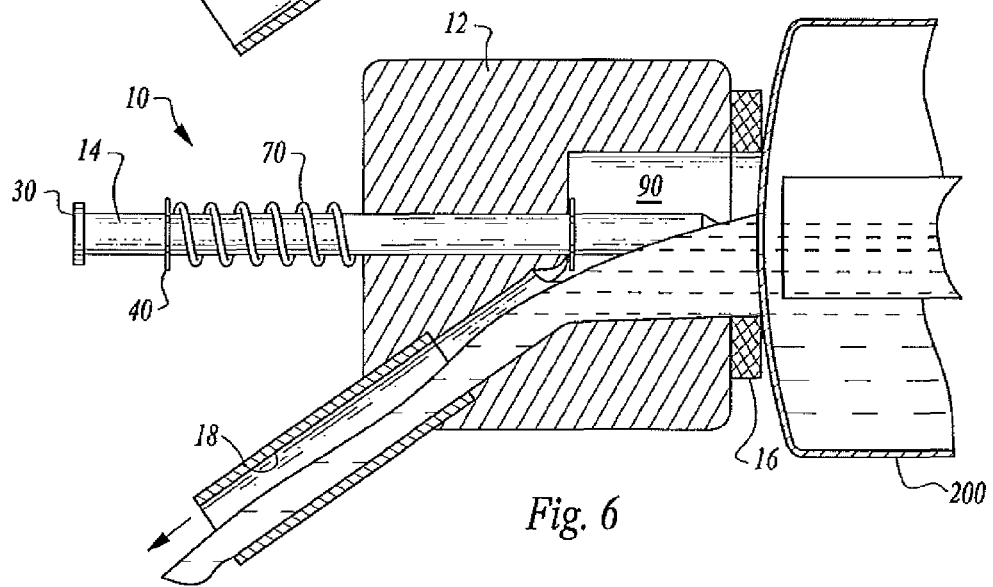
FIG. 6 is a detailed sectional view of an embodiment of tool for oil filter drainage 10 of FIG. 1 taken at "4-4" depicting the flow of oil from the oil filter 200 into the internal chamber 90 and exiting there from through the drainage channel 18.

Referring to FIGS. 1 through 11, wherein like reference numerals refer to like components in the various views, there is illustrated therein a new and improved tool for oil filter drainage. These views collectively show that the tool for oil filter drainage is adapted for a wide range of internal combustion vehicle engines having threaded spin-on type oil filters.

An embodiment of the tool for oil filter drainage provides a round, magnetic end ring element 16 attached to a central block body element 12, FIGS. 1-6. The central block body element 12 contains an internal collection chamber 90, and a central axis with an axial bore along the central axis through the central block body element 12, FIGS. 2 and 4-6. The axial bore houses the piercing pin 14 and a resilient spring 70, including a striking surface 30, spring retainer 40, retaining clip groove 50, tapered point 60, and retaining clip 80, FIGS. 1-6.

The central block body element 12 internal chamber 90 further provides a drainage channel 18 from the internal chamber to outside the central block body element 12, FIGS. 1-6. The piercing pin 14 is sized to extend beyond central block body element 12 and into the central block body element 12 internal chamber 90 so as to sufficiently extend beyond the round, magnetic end ring element 16 and through the metal wall of a threaded spin-on type oil filter attached to the round, magnetic end ring element 16 when the piercing pin 14 is struck on the striking surface 30. The piercing pin 14 is fitted with a seal between it and the central block body element 12 internal chamber 90. Further, the piercing pin 14 is fitted with a retaining clip groove 50 and retaining clip 80 within the central block body element 12 internal chamber 90 to prevent the piercing pin 14 from sliding out of the central block body element 12, FIG. 4.

The tapered point 60 of the piercing pin 14 is suitable for piercing the exterior of an oil filter 200. The exterior portion of the piercing pin 14 relative to central block body element 12 includes a striking surface 30 and retainer 40. The piercing pin 14 is aligned in the axial bore of the central block body element 12 so that the resilient spring 70 is between the retainer 40 and the central block body element 12. In this manner, after force has been applied to the striking surface 30, such as a blow from a hammer, to drive the tapered point 60 into the oil filter side, the piercing pin 14 is returned to its original position by the force from compression of the coil spring 70 between the retainer 40 and the central block body element 12, FIGS. 4 and 5.

The drainage channel 18 from the internal chamber 90 to outside the central block body element 12 is sized to be connected to standard hose or tubing (not shown) to direct the flow of the waste oil from the oil filter through the internal chamber 90 to an oil drain pan or other collection reservoir (not shown) for waste engine oil.

Thus, the embodiment of the tool 10 for oil filter drainage for FIGS. 1-6, provides a central block body element 12 with a round, magnetic end ring element 16 suitable for attachment to a metal, threaded spin-on type oil filter on a vehicle engine. Once the central block body element 12 is so attached to the oil filter, the piercing pin 14 striking surface 30 is struck with force sufficient to overcome the tension of the coil spring 70, and the piercing pin 14 tapered point 60 travels along the axial bore of the central block body element 12, through the through the internal chamber 90, past the round, magnetic end ring element 16, piercing into and through the oil filter wall. As the coil spring 70 returns the piercing pin 14 to the original position before the striking force was applied to the piercing pin 14 striking surface 30, waste oil flows from the punctured oil filter into the internal chamber 90, out the drainage channel 18, through a hose or tube connected to the drainage channel 18, and into a waste oil drain pan or containment reservoir.

An alternate embodiment of the tool for oil filter drainage 110 includes a cylindrical central body element 112 having an magnetic end ring element 116 and an internal chamber 190, a central axis with an axial bore along the central axis through the central block body element 112, the axial bore housing a piercing pin 114 and a spring 170 assembly having a striking surface 130 and a retainer pin 140 and a threaded drainage channel 118 and threaded drain 120, FIGS. 7-10.

As detailed in FIGS. 1-11, the apparatus for embodiments of a tool 10 or 110 for draining oil from an oil filter prior to removal of the oil filter includes an oil receptacle housing 12 or 112, respectively, sized to be attached to the end of an oil filter 200 to be removed. The oil receptacle housing 12 or 112 provides an internal oil collection chamber, 90 or 190, respectively. An axial bore connects an external surface of the oil receptacle housing 12 or 112 to the internal oil collection chamber, 90 or 190, respectively. The oil receptacle housing 12 or 112 further provides an oil receptacle housing oil collection chamber open end. A drainage channel 18 or 118, 120 from the internal oil collection chamber, 90 or 190, respectively, travels through the oil receptacle housing, 12 or 112, respectively, and extends from the oil receptacle end surface opposite from the open receptacle housing oil collection chamber end.

The oil receptacle housing oil collection chamber 90 or 190 open end provides easy access to the piercing pin 114 and the piercing pin retaining assembly (either retaining clip 80/retaining clip slot 50, or pin 140/pin aperture 115) residing within the oil receptacle housing oil collection chamber 90 or 190 for maintenance to, or replacement of, the piercing pin 114, the resilient spring 70 or 170, the resilient spring retainer assembly, and/or the piercing pin retainer assembly, over the life of the tool 10 or 110 for oil filter drainage.

A piercing pin 114 sized to be received within the oil receptacle housing 12 or 112 axial bore, has a length portion extending from the oil receptacle housing, 12 or 112, end opposite from the oil receptacle housing oil collection chamber, 90 or 190, open end. The piercing pin 114 provides a striking head end 30 or 130 on the length portion of the piercing pin extending from the oil receptacle housing, 12 or 112, end opposite from the open receptacle housing oil collection chamber end. The piercing pin 114 further includes a tapered point end 60 on a piercing pin length portion within the oil receptacle housing oil collection chamber, 90 or 190, respectively, open end.

For one embodiment of a tool 10 for draining oil from an oil filter prior to removal of the oil filter, a spring retaining slot 50 resides on the length portion of the piercing pin extending from the oil receptacle housing 10 end opposite from the oil receptacle housing oil collection chamber open end, and retaining clip slot 50 resides on the piercing pin length portion within the oil receptacle housing oil collection chamber 90 open end, FIGS. 1-6, 11. A spring retainer 40 sized to be received and fixedly reside in the piercing pin spring retaining slot 50 retains a resilient spring 70, sized to receive a length portion of the piercing pin 114 extending from the oil receptacle housing 12 end opposite from the oil receptacle housing oil collection chamber 90 open end, between the spring retainer 40 and the external surface of the oil receptacle housing 12. A second retaining clip 80 sized to be received and fixedly reside in the piercing pin retaining clip slot 50 retains the movement of the piercing pin 114 within the internal oil collection chamber 90 once the striking force is removed and the resilient spring 70 pushes the piercing pin 114 back from the oil filter 200 end, FIGS. 4-6.

For an alternate embodiment of a tool 110 for draining oil from an oil filter prior to removal of the oil filter, the striking head 130 of the piercing pin 114 extending from the oil receptacle housing 110 end opposite from the oil receptacle housing oil collection chamber 190 retains the resilient spring 170 along that length portion of the piercing pin 114 between the non-striking surface of the striking head 130 and the oil receptacle housing 112 end opposite from the oil receptacle housing oil collection chamber 190 open end, FIGS. 7-10. A pin 115 sized to be received and fixedly reside in the piercing pin 114 pin aperture 115 retains the movement of the piercing pin 140 within the internal oil collection chamber 190 once the striking force is removed and the resilient spring 170 pushes the piercing pin 114 back from the oil filter 200 end.

A magnetic assembly 16 or 116 integral to the oil receptacle housing oil collection chamber 90 or 190 open end attaches the oil receptacle housing oil collection chamber, 90 or 190, respectively open end to the oil filter 200 end.

Once the embodiments of a tool 10 or 110, for draining oil from an oil filter prior to removal of the oil filter, oil receptacle housing 12 or 112, respectively, is attached to the oil filter 200 end, force applied to the striking head 30 or 130, respectively, of the piercing pin 114 moves the piercing pin 114 along the axial bore through the oil receptacle housing oil collection chamber, 90 or 190, respectively, to pierce a hole in the oil filter 200 end surrounded by the oil receptacle housing, 12 or 112, respectively. When the striking force is removed, the resilient spring 70 or 170 pushes the piercing pin 114 back from the oil filter 200 end, allowing gravity to pull oil from the pierced oil filter 200 end through the pierced portion of the oil filter end and into the oil receptacle housing oil collection chamber, 90 or 190, respectively. Gravity continues to induce the oil to flow out of the oil receptacle housing 12 or 112, respectively, through the drainage channel 18 or 118, 120 and into suitable waste oil storage receptacle (not shown) through a length of hose (not shown) having a first end affixed to the drainage channel 18 or 120 and a second end inserted into a waste oil storage receptacle.

The round, magnetic end ring element 16 or magnetic end ring element 116 may have varying thickness to accommodate differing oil filter contours, or to access an oil filter rounded side. Magnetic end ring element 16 or magnetic end ring element 116, as depicted in FIGS. 8-9, may have a convex face to accommodate the curved portion of the oil filter 200 end to which it will be attached.

The block body element 12 or cylindrical central body element 112 may further include a seal element for improving the seal between the oil filter 200 end and the central block body element 12 or cylindrical central body element 112. This seal element for an embodiment of the block body element 12 includes a groove 52 housing an O-ring 54 in the surface of the block element 12 within the round, magnetic end ring element 16 integral to the block body element 12, FIG. 11.

Another advantage of the tool for oil filter drainage is that it can be inexpensively employed over repeated and multiple oil filter removals in typical mechanical environments by lay persons or skilled mechanics.

The above discussion is intended to depict one of the embodiments for creating and operating the tool for oil filter drainage although anyone skilled in this art would readily recognize alternative embodiments which are intended to be encompassed by the disclosure and any claims associated therewith.

The above disclosure is sufficient to enable one of ordinary skill in the art to practice the tool for oil filter drainage, and provides the best mode of practicing the tool for oil filter drainage presently contemplated by the inventor. While there is provided herein a full and complete disclose of the preferred embodiments of this tool for oil filter drainage, it is not desired to limit the invention to the exact construction, dimensional relationships and operation shown and described. Various modifications, alternative constructions, change and equivalents will readily occur to those skilled in the art and may be employed, as suitable, without departing from the true spirit and scope of the tool for oil filter drainage. Such changes might involve alternative materials, components, structural arrangements, sizes, shaped, forms, functions, operational features or the like.

I claim:

1. A tool for draining oil from an oil filter prior to removal of the oil filter, the oil filter comprising a fluid connecting end, an opposite end comprising an external surface, and sides, the tool comprising in combination:
  a) an oil receptacle housing sized to be attached to only a portion of the external surface of the opposite end of the oil filter to be removed such that the oil receptacle housing contacts only a portion of the oil filter opposite end external surface without contacting or surrounding the oil filter sides, the oil receptacle housing comprising an internal oil collection chamber, an axial bore from an external surface of the oil receptacle housing to the internal oil collection chamber, an oil receptacle housing oil collection chamber open end, and a drainage channel from the internal oil collection chamber through the oil receptacle housing and extending from an oil receptacle end surface opposite from the open receptacle housing oil collection chamber end;
  b) a piercing pin sized to be received within the oil receptacle housing axial bore with a length portion of the piercing pin extending from the oil receptacle end opposite from the open receptacle housing oil collection chamber end, the piercing pin comprising a striking head end on the length portion of the piercing pin extending from the oil receptacle end opposite from the open receptacle housing oil collection chamber end, a tapered point end on a piercing pin length portion within the oil receptacle housing oil collection chamber open end, and a piercing pin retaining assembly on the piercing pin length portion within the oil receptacle housing oil collection chamber open end;
  c) a resilient spring retainer assembly;
  d) a resilient spring sized to receive a length portion of the piercing pin extending from the oil receptacle end opposite from the open receptacle housing oil collection chamber open end, between the spring retainer assembly and the external surface of the external surface of the oil receptacle housing; and
  e) magnetic means integral to the oil receptacle housing oil collection chamber open end for attaching the oil receptacle housing oil collection chamber open end to only a portion of the oil filter external surface;
  whereby when the oil receptacle housing is attached to only a portion of the oil filter end external surface, force applied to the striking head moves the piercing pin through the oil receptacle housing oil collection chamber to pierce a hole in the oil filter opposite end external surface surrounded by the oil receptacle housing, and once the striking force is removed the spring pushes the piercing pin back from the oil filter opposite end external surface, allowing gravity to pull oil from the pierced oil filter opposite end external surface through the pierced portion of the oil filter external surface and into the oil receptacle housing, and then to flow out of the oil receptacle housing through the drainage channel and into a waste oil storage receptacle through a length of hose having a first end affixed to the drainage channel and a second end inserted into a waste oil storage receptacle.

2. The tool for draining oil from an oil filter prior to removal of the oil filter of claim 1, wherein the oil receptacle housing further comprises a block exterior, and the oil receptacle housing oil collection chamber open end is circular.

3. The tool for draining oil from an oil filter prior to removal of the oil filter of claim 2, wherein magnetic means integral to the oil receptacle housing oil collection chamber open end for attaching the oil receptacle housing oil collection chamber open end to the oil filter end comprises a ring magnet integral to the oil receptacle housing and sized to seal the oil receptacle housing oil collection chamber open end to only a portion of the external surface of the oil filter opposite end.

4. The tool for draining oil from an oil filter prior to removal of the oil filter of claim 3, wherein the oil receptacle housing further comprises a groove housing an O-ring within the ring magnet integral to the oil receptacle housing and whereby the groove and the O-ring are sized to seal the oil receptacle housing oil collection chamber open end to only a portion of the external surface of the oil filter opposite end.

5. The tool for draining oil from an oil filter prior to removal of the oil filter of claim 4, wherein the resilient spring retainer assembly comprises a spring retaining slot on the length portion of the piercing pin extending from the oil receptacle end opposite from the open receptacle housing oil collection chamber open end, and a spring retainer sized to be received and fixedly reside in the piercing pin spring retaining slot.

6. The tool for draining oil from an oil filter prior to removal of the oil filter of claim 4, wherein the piercing pin retaining assembly comprises a retaining clip slot on the piercing pin length portion within the oil receptacle housing oil collection chamber open end, and a retaining clip sized to be received and fixedly reside in the piercing pin retaining clip slot.

7. The tool for draining oil from an oil filter prior to removal of the oil filter of claim 1, wherein the oil receptacle further comprises a cylindrical exterior, and the receptacle housing oil collection chamber open end is circular.

8. The tool for draining oil from an oil filter prior to removal of the oil filter of claim 7, wherein magnetic means integral to the oil receptacle housing oil collection chamber open end for attaching the oil receptacle housing oil collection chamber open end to only a portion of the oil filter opposite end external surface comprises a ring magnet integral to the oil receptacle housing and sized to seal the oil receptacle housing oil collection chamber open end to only a portion of the external surface of the oil filter.

9. The tool for draining oil from an oil filter prior to removal of the oil filter of claim 8, wherein the ring magnet integral to the oil receptacle housing comprises a convex external surface.

10. The tool for draining oil from an oil filter prior to removal of the oil filter of claim 9, wherein the resilient spring retainer assembly comprises a non-striking surface of the piercing pin striking head.

11. The tool for draining oil from an oil filter prior to removal of the oil filter of claim 10, wherein the piercing pin retaining assembly comprises a pin sized to be received and fixedly reside in a piercing pin aperture on a piercing pin length portion within the oil receptacle housing oil collection chamber.

12. A tool for draining oil from an oil filter prior to removal of the oil filter, the oil filter comprising a fluid connecting end, an opposite end comprising an external surface, and sides, the tool comprising an oil collection chamber within an oil receptacle housing, the oil receptacle housing further comprising in combination:

a) an oil receptacle housing open end connected to the oil collection chamber and sized to be securely adapted to the oil filter to be removed such that the oil receptacle housing contacts only a portion of the oil filter opposite end external surface without contacting or surrounding the oil filter sides;

b) means for securely adapting the oil receptacle housing open end to only a portion of the oil filter opposite end external surface;

c) resilient means movable within the oil receptacle housing for piercing the oil filter opposite end external surface; and d) means for evacuating the oil flowing from the pierced oil filter opposite end external surface into the oil collection chamber from the oil receptacle housing.

13. The tool for draining oil from an oil filter prior to removal of the oil filter of claim 12, wherein means for securely adapting the oil receptacle housing open end to the oil filter opposite end external surface comprises a ring magnet integral to the oil receptacle housing and sized to seal the oil receptacle housing oil collection chamber open end to the external surface of the oil filter.

14. The tool for draining oil from an oil filter prior to removal of the oil filter of claim 12, wherein resilient means movable within the oil receptacle housing for piercing only a portion of the oil filter opposite end external surface comprises in combination:

a) a piercing pin sized to be received within the oil receptacle housing axial bore with a length portion of the piercing pin extending from the oil receptacle end opposite from the open receptacle housing oil collection chamber end, the piercing pin comprising a striking head end on the length portion of the piercing pin extending from the oil receptacle end opposite from the open receptacle housing oil collection chamber end, a tapered point end on a piercing pin length portion within the oil receptacle housing oil collection chamber open end, and a piercing pin retaining assembly on the piercing pin length portion within the oil receptacle housing oil collection chamber open end;

b) a resilient spring retainer on the length portion of piercing pin extending from an oil receptacle end opposite from the oil receptacle housing oil collection chamber open end; and c) a resilient spring sized to receive a portion of the length portion of the piercing pin extending from the oil receptacle end opposite from the oil receptacle housing oil collection chamber open end, between the resilient spring retainer and an external surface of the oil receptacle housing.

15. The tool for draining oil from an oil filter prior to removal of the oil filter of claim 12, wherein means for evacuating the oil flowing from the pierced oil filter opposite end external surface into the oil collection chamber from the oil receptacle housing comprises a drainage channel from the internal oil collection chamber through the oil receptacle housing and extending from an oil receptacle end surface opposite from the open receptacle housing oil collection chamber end.

16. The tool for draining oil from an oil filter prior to removal of the oil filter of claim 13, wherein the oil receptacle housing further comprises a groove housing an O-ring sized to seal the oil receptacle housing oil collection chamber open end to only a portion of the external surface of the oil filter opposite end within the ring magnet.

17. The tool for draining oil from an oil filter prior to removal of the oil filter of claim 13, wherein the ring magnet comprises a convex external surface.

18. Oil filter draining tool for an oil filter comprising a fluid connecting end, an opposite end comprising an external surface, and sides, the tool attached to the oil filter opposite end external surface such that the oil receptacle housing contacts only a portion of the oil filter end without contacting or surrounding the oil filter sides, whereby force applied to a striking head moves a piercing pin through an oil receptacle housing oil collection chamber axial bore to pierce a hole in only a portion of the oil filter opposite end external surface surrounded by the oil receptacle housing, and once the striking force is removed a resilient spring pushes the piercing pin back from the oil filter end, allowing gravity to pull oil from the pierced oil filter opposite end external surface through the pierced portion of the oil filter opposite end external surface and into the oil receptacle housing, and then to flow out of the oil receptacle housing through the drainage channel and into a waste oil storage receptacle through a length of hose having a first end affixed to the drainage channel and a second end inserted into a waste oil storage receptacle, the tool further comprising:
- a) a striking head end on the length portion of the piercing pin extending from an oil receptacle housing end opposite from an open receptacle housing oil collection chamber end;
- b) a tapered point end on a piercing pin length portion within the oil receptacle housing oil collection chamber open end;
- c) a piercing pin retaining assembly on the piercing pin length portion within the oil receptacle housing oil collection chamber open end; and
- d) magnetic means integral to the oil receptacle housing oil collection chamber open end for attaching and securing the oil receptacle housing oil collection chamber open end to only a portion of the oil filter end external surface.

19. The oil filter draining tool of claim 18, wherein magnetic means integral to the oil receptacle housing oil collection chamber open end for attaching the oil receptacle housing oil collection chamber open end to only a portion of the oil filter opposite end external surface end comprises a ring magnet integral to the oil receptacle housing and sized to seal the oil receptacle housing oil collection chamber open end to only a portion of the external surface of the oil filter opposite end.

20. The oil filter draining tool of claim 19, wherein the oil receptacle housing further comprises a groove housing an O-ring within the ring magnet integral to the oil receptacle housing whereby the groove and the O-ring are sized to seal the oil receptacle housing oil collection chamber open end to only a portion of the external surface of the oil filter opposite end.

21. The oil filter draining tool of claim 19, wherein the ring magnet integral to the oil receptacle housing comprises a convex external surface.

\* \* \* \* \*